(12) United States Patent
Hachimaki

(10) Patent No.: US 6,540,817 B1
(45) Date of Patent: Apr. 1, 2003

(54) HOLLOW FIBER MEMBRANE DEHUMIDIFICATION DEVICE

(75) Inventor: Takeshi Hachimaki, Akashi (JP)

(73) Assignee: Nabco, LTD, Kobe (JP)

( * ) Notice: Subject to any disclaimer, the term of this patent is extended or adjusted under 35 U.S.C. 154(b) by 0 days.

(21) Appl. No.: 09/761,510

(22) Filed: Jan. 16, 2001

(30) Foreign Application Priority Data

Feb. 18, 2000 (JP) ........................................ 2000-046708

(51) Int. Cl.⁷ .......................... B01D 53/22; B01D 53/26
(52) U.S. Cl. ...................................... 96/8; 95/52; 96/10
(58) Field of Search .............................. 95/45, 52; 96/4, 96/7, 8, 10

(56) References Cited

U.S. PATENT DOCUMENTS

| | | | | |
|---|---|---|---|---|
| 3,735,558 A | * | 5/1973 | Skarstrom et al. | 95/52 X |
| 4,718,921 A | * | 1/1988 | Makino et al. | 96/8 X |
| 4,881,953 A | * | 11/1989 | Prasad et al. | 96/10 X |
| 5,160,514 A | * | 11/1992 | Newbold et al. | 95/52 X |
| 5,259,869 A | * | 11/1993 | Auvil et al. | 95/52 |
| 5,411,662 A | * | 5/1995 | Nicolas, Jr. et al. | 96/10 X |
| 5,470,379 A | * | 11/1995 | Garrett | 96/4 |
| 5,525,143 A | * | 6/1996 | Morgan et al. | 95/52 |
| 5,605,564 A | * | 2/1997 | Collins | 95/52 |
| 5,961,692 A | * | 10/1999 | Collins | 95/52 X |
| 6,004,383 A | * | 12/1999 | Kuhnelt | 95/52 X |
| 6,070,339 A | * | 6/2000 | Cunkelman | 95/52 X |
| 6,128,825 A | * | 10/2000 | Cunkelman | 95/52 X |
| 6,296,683 B1 | * | 10/2001 | Koch | 95/52 X |
| 6,315,814 B1 | * | 11/2001 | Barry et al. | 96/4 X |

FOREIGN PATENT DOCUMENTS

| | | | |
|---|---|---|---|
| JP | 62-042723 A | * 2/1987 | 95/52 |
| JP | 02-083015 A | * 3/1990 | 95/52 |
| JP | 03-143523 A | * 6/1991 | 95/52 |

* cited by examiner

*Primary Examiner*—Robert H. Spitzer
(74) *Attorney, Agent, or Firm*—James Ray & Associates

(57) ABSTRACT

A hollow fiber membrane dehumidification device that possess hollow fiber membranes that cause the compressed air supplied from one end to the interior to flow through and at the same time discharge moisture in the compressed air to the outside, and by so doing exhausts the compressed air to the other end as dehumidified air. There is a reflux route that causes a portion of the dehumidified air exhausted from the hollow fiber membranes to flow back to the outside of the hollow fiber membranes as purged air and a variable restrictor that is provided on the reflux route that increases or decreases the opening-closing volume in accordance with the increase or the decrease of the pressure of the compressed air that flows through the interior of the hollow membranes.

2 Claims, 5 Drawing Sheets

HOLLOW FIBER MEMBRANE DEHUMIDIFICATION DEVICE

TECHNICAL FIELD TO WHICH THE INVENTION PERTAINS

The present invention relates to a hollow fiber membrane dehumidification device that dehumidifies compressed air by means of hollow fiber membranes.

1. Prior Art

Since the compressed air that is employed for a drive source for all kinds of devices becomes the cause of early corrosion of the devices when it contains a large amount of moisture ordinarily it is employed as the drive source after it has been dehumidified by a dehumidifier. A freezing type and an adsorption type are generally adopted for this kind of dehumidification device, but in recent years hollow fiber membrane type dehumidification devices have attracted attention based on the facts that they have been miniaturized, made lighter, and had their maintenance operations simplified.

Previously the above-mentioned hollow fiber membrane dehumidification devices involved as shown in FIG. 5 the positioning of multiple hollow fiber membranes (52) in a housing chamber (53) inside a housing (51), and the sending in of compressed air from one end of these hollow fiber membranes (52), and while this compressed air was caused to flow through the inside the moisture in the compressed air was selectively discharged to the housing chamber (53) owing to the pressure difference between the partial pressure of the water vapor of the compressed air and the partial pressure of the water vapor of the outside housing chamber. Then, after the compressed air has been made into dehumidified air by dehumidifying it in this manner, it is discharged from the other end of the hollow fiber membranes, and made into a drive source by emitting it to the air tank at the rear stage, etc. In addition, it has been composed such that it is usually possible to dehumidify the compressed air with an excellent dehumidification function by causing a portion of the dehumidified air that is exhausted to flow back to the housing chamber (53) in a fixed constrictor amount through the medium of the reflux route (54) as purged air and by maintaining the partial pressure of the water vapor inside the housing chamber (53) in a low state by means of this purged air.

2. Problems that the Invention Attempts to Solve

However, as in the above-mentioned prior art, in the case of a composition that causes the reflux of a portion of the dehumidified air by a fixed constrictor amount as purged air, there is the problem that it becomes impossible to emit dehumidified air to the air tank at the rear stage, etc. at a pressure above that prescribed, even in the event that the pressure of the compressed air deviates slightly from the normal fluctuation range and declines.

In other words, when the dehumidified air formed by dehumidifying compressed air is emitted to the air tank at the rear stage, etc., a portion flows back to the housing chamber as purged air, so it causes the pressure to fluctuate while being subjected to the effects of the pressure fluctuations of the compressed air and the pressure fluctuations in response to the reflux amount of the purged air. At this time, when the pressure of the compressed air declines, the reflux amount of the purged air declines together with the pressure of the dehumidified air in tandem with this, so the effect whereby the purged air causes the pressure of the dehumidified air to decline ends up decreasing, but since the constrictor volume of the purged air is fixed the effects of the decline of pressure of the purged air ends up being relatively large in the relationship between the compressed air and the purged air. As a result of this, even in the event that the pressure of the compressed air deviates slightly from the normal fluctuation range and declines, the pressure of the dehumidified air ends up declining by a wide extent due to the effect of the purged air, so when this dehumidification device is incorporated in an air source system it is easy to fall into a fatal state wherein it is not possible to send the dehumidified air to the air tank at the rear stage, etc., at a pressure above that prescribed.

Therefore, the purpose of the present invention is the provision of a hollow fiber membrane type dehumidification device that can emit dehumidified air to an air tank at the rear stage, etc. at the highest possible pressure, even in the event that the pressure of the compressed air has declined by a wide margin.

3. Means for Solving the Problems

In order to solve the above-mentioned problems, the invention is a hollow fiber membrane dehumidification device characterized by the fact that it possesses (a) hollow fiber membranes that cause the compressed air supplied from one end to the interior to flow through and at the same time discharges the moisture in said compressed air to the outside, and by so doing exhausts said compressed air to the other end as dehumidified air; (b) a reflux route that causes a portion of the dehumidified air exhausted from said hollow fiber membranes to flow back to the outside of said hollow fiber membranes as purged air; and (c) a variable restrictor that is provided on said reflux route that increases or decreases the opening-closing volume in accordance with the increase or decrease of the pressure of the compressed air that flows through the interior of said hollow fiber membranes.

In the above-mentioned composition, a portion of the dehumidified air is flowing back as purged air, so the pressure of the dehumidified air undergoes the action of the pressure fluctuations of the compressed air itself supplied from the front stager and that of the pressure fluctuations in response to the reflux amount of the purged air. Therefore, when the constrictor amount of purged air is fixed (fixed constrictor) as in the prior art, the decline in pressure due to the purged air ends up exerting a great action on the decline in pressure of the dehumidified air, even in the event that the reflux amount of the purged air declines in accordance with the decline in pressure of the compressed air itself. As a result of this, when a hollow fiber membrane type dehumidification device is incorporated in an air source system, it is easy to fall into a fatal state as an air source system wherein it is not possible to send the dehumidified air to the air tank at the rear stage, etc., at a pressure above that prescribed, even in the event that the pressure of the compressed air deviates slightly from the normal fluctuation range and declines.

Compared to this, according to the above-mentioned composition of the invention of the present application, when the pressure of the compressed air that flows through the interior of the hollow fiber membranes declines, the opening-closing amount of the variable constrictor decreases, and due to this the reflux amount of the purged air decreases. Owing to this, the decline in pressure due to the purged air is more strongly controlled than in the case of the fixed constrictor, and due to this an excessive decline in pressure of the dehumidified air is prevented. As a result, in the event that a hollow fiber membrane type dehumidification device is incorporated in an air source system, it is possible to send the dehumidified air to the air tank of the dehumidification system at the highest possible pressure even if the pressure of the decompressed air ends up declining to a great extent.

In addition, the invention is characterized by the fact that it possesses (a) a primary flow route and a secondary flow route that split the reflux route into 2 branches; (b) a first orifice that is provided on said primary flow route and that controls the flow of purged air in said primary flow route; and (c) a flow volume regulation valve that has been made capable of opening the valve part based on the opening-closing volume in response to the pressure differential of the purged air that flows back through said primary flow route and said secondary flow route, and that causes said primary flow route to be linked to said reflux route through the medium of said valve part.

According to the above-mentioned composition, since it comprises a composition that combines mechanical parts whereby the constrictor operates by the pressure of the compressed air, it ends up being a highly reliable item that rarely breaks down compared with a composition that causes the operation by combining electrical parts.

In addition, the invention is characterized by the fact that it possesses a second orifice that controls the flow of said dehumidified air.

According to the above-mentioned composition, owing to the fact that the second orifice controls the flow of the dehumidified air in accordance with the pressure, it is possible to control excessive pressure fluctuations of the dehumidified air. Owing to this, it is possible to control excessive pressure fluctuations also for the purged air that is created by extracting a portion of the dehumidified air, so it is possible to prevent unstable operation such as hunting by the variable constrictor, etc.

PREFERRED EMBODIMENT OF THE INVENTION

There follows below an explanation of the preferred embodiment of the present invention based on FIG. 1 to FIG. 4.

The hollow fiber membrane type dehumidification device for the embodiment of the present invention is employed by incorporating it into the air source system of such things as railway cars, large automobiles, ships, and other machine equipment. This air source system possesses, in order from the upper stage to the rear stage, as shown in FIG. 1, (a) an air compressor (1) that is a compressor employing the atmosphere as compressed air; (b) an aftercooler (2) that dehumidifies the compressed air by cooling it; (c) a separator (3) that eliminates the water droplets and dust and oil mist in the compressed air; (d) a hollow fiber membrane type dehumidification device (4) that dehumidifies the compressed air and makes it into dehumidified air; (e) a second orifice (30) that controls the flow of dehumidified air; and (f) an air tank that accumulates under pressure the dehumidified air.

The above-mentioned hollow fiber membrane dehumidification device possesses, as shown in FIG. 2, a housing (6) composed of a drum part (6a) formed in a cylindrical shape and cover parts (6b, 6c) that seal both end surfaces of this drum part (6a). An air intake opening (6d) and an air exhaust opening (6e) have been formed on both the cover parts (6b, 6c), respectively. Then, the separator (3) in FIG. 1 and the air tank have been respectively connected to the air intake opening (6d) and the air exhaust opening (6e) through the medium of air piping that is not shown in the figure.

On the other hand, a pair of partition elements (7, 7) has been provided in the interior of the drum (6a). Each partition element (7) has been provided on the sides of the covers (6b, 6c), and an edge part has been joined to the entire inner partition wall surface of the drum (6a) in a hermetically sealed state. These partition elements have divided the internal space of the housing (6) into 3 with an air intake chamber (8) formed by the partition element on one side (7) and the cover (6b), an air exhaust chamber (9) formed by the partition element on the other side (7) and the cover (6c), and a housing chamber (10) formed by the two partition elements (7, 7).

Multiple hollow fiber membranes (11) have been provided on the above-mentioned housing chamber (10). When a pressure differential arises in the partial pressure of water vapor between the inside and the outside of the membranes, the hollow fiber membranes (11) possess the function of causing only water vapor to permeate selectively from the high pressure side to the low pressure side. The two end parts of these hollow fiber membranes (11) are being supported in a hermetically sealed state by the partition elements (7, 7), and each end of these hollow fiber membranes (11) has been respectively opened to the air intake opening (8) and the air exhaust opening (9). By this means, the hollow fiber membranes (11) are configured such that the compressed air introduced to the air intake chamber (8) is taken in from the opening of one end and passed through the inside of the membranes, and at the same time it is into dehumidified air by discharging the water vapor to the housing chamber (10), after which this dehumidified air is discharged from the opening on the other end to the air exhaust chamber (9).

The housing chamber (10) on which the above-mentioned hollow fiber membranes (11) have been provided has been linked to the air exhaust chamber (9) through the medium of a reflux route, etc., and has in addition been opened to the atmosphere through the medium of a through hole. The reflux route possesses (a) a reflux hole (6g) formed on the drum (6a), and (b) a pipe used for reflux (13), one end of which is connected to this reflux hole (6g) and the other end of which is connected between the housing (6) and the second orifice (30), and a portion of the dehumidified air sent from the air exhaust chamber (9) to the air tank of the rear stage is taken in and caused to flow back to the housing chamber (10) as purged air. On the other hand, the through route possesses a through hole (6f) formed on the drum (6a), and the water vapor of the housing chamber (10) and the purged air is emitted to the atmosphere through the medium of the through hole (6f).

In addition, a variable constrictor (12) that increases or decreases opening-closing amount in accordance with the increase or decrease of the pressure of the compressed air has been provided in the pipe used for reflux (13) in the above-mentioned reflux route. As shown in FIG. 1, the variable constrictor (12) possesses (a) a primary pipe (14) and a secondary pipe (15) that split the pipe used for reflux (13) positioned on the upstream side into 2 branches, (b) a first orifice (16) provided on the primary pipe (14), and (c) a flow volume regulation valve (17) that is connected to the primary pipe (14) and the secondary pipe (15). By controlling the control of purged air in the primary pipe (14), the first orifice (16) acts such that the pressure (P2) of the primary pipe (14) is set at a lower pressure than the pressure (P1) of the secondary pipe (15).

In addition, the flow volume regulation valve (17) possesses a block body (18) that can be divided into 2 parts, as shown in FIG. 3. The block body (18) possesses (a) a cylinder chamber (19) formed in a cylindrical shape, (b) a membrane plate chamber (20) formed in the outer circumferential direction of the cylinder chamber (19), and (c) a valve chamber (21) formed in the axial direction of the cylinder chamber (19). The cylinder chamber (19) and the valve chamber (21) have been linked through the medium of an abrading passage (22), and a tubular seal element (23) has been provided on the abrading passage (22).

A bar-shaped piston element (24) has been inserted through the above-mentioned seal element (23) such that it can abrade freely. The piston element (24) has been formed such that the rear end part (the end part on the right side in the figure) and the front end part (the end part on the left side in the figure) are respectively positioned in the cylinder chamber (19) and the valve chamber (21), and a first protruding part (24a) and a second protruding part (24b) have been provided next to one another separated by a fixed interval on the lateral circumferential surface of the membrane plate chamber (20). These first and second protruding parts (24a, 24b) have been provided in a position that corresponds to the membrane plate chamber (20), and a thin plate element (25) for the purpose of moving the piston element (24) forward and backward in an axial direction (the left-right direction in the figure) has been provided between both protruding parts (24a, 24b).

The above-mentioned thin plate element (25) has been formed in a disk shape with synthetic resin, etc., such that it can change shape in the direction of its thickness. The above-described piston element (24) has been inserted through the central part of the thin plate element (25) in a hermetically sealed state. On the other hand, the outer circumferential edge part of the thin plate element (25) has been clasped and held in the membrane plate chamber (20) in a hermetically sealed state. Owing to this, the cylinder chamber (19) has been divided into a first space (19a) and a second space (19b) by the thin plate element (25) in a hermetically sealed state.

The above-mentioned first space (19a) has been linked to a first input port (18a) through the medium of a first secondary flow route (26a). On the other hand, the second space (19b) has been linked to a second input port (18b) through the medium of a second secondary flow route (26b) and a primary flow route (27). These ports (18a, 18b) have been connected to the secondary pipe (15) and the primary pipe (14), respectively, and the first input port (18a) introduces the purged air of the secondary pipe (15) into the second space (19b) with a pressure of P1. In addition, the second input port (18b) introduces the purged air of the primary pipe (14) into the first space (19a) with a pressure of P2. Owing to this, a differential pressure between the pressure (P1) and the pressure (P2) arises between the first space (19a) and the second space (19b), and due to this the central part of the thin plate element (25) that partitions these spaces (19a, 19b) is displaced in the axial direction of the piston element (24) based on the amount of the displacement of the pressure differential, and the piston element (24) moves backwards and forwards in an axial direction in accordance with this displacement.

As for the piston element (24), which moves backwards and forwards in the above-described manner, the front end of the valve chamber (21) has been formed in a pyramidal conical shape. In addition, a valve flow route (28) linked to the primary flow route (27) has been opened on the wall surface in the valve chamber (21) in the axial direction of the piston element (24), and this valve flow route (28) and the front end part of the piston element (24) have composed a valve part that can be opened by the opening-closing amount corresponding to the pressure differential of the purged air. Concretely, in a state where there is almost no pressure differential, the valve part has been composed such that the piston element (24) advances to the left end in the figure, and due to this the opening of the valve flow route (28) is turned into a completely blocked state, the position of the piston element (24) in this state becomes the standard position, and the valve part opens with an opening corresponding to the amount of movement when the piston element (24) withdraws to the right side in the figure. Then the valve part composed in this manner has been linked to the output port (18c) through the medium of the valve chamber (21) and the discharge flow route (29), and as shown in FIG. 1 the purged air is caused to flow back to the housing chamber (10) of the hollow fiber membrane dehumidification device (4) with a flow volume corresponding to the opening.

In the above composition, an explanation is provided below of the action of the hollow fiber membrane type dehumidification device (4).

First, after the external air has been made into compressed air with a prescribed pressure by the air compressor (1), it is dehumidified to a certain extent by cooling in the aftercooler (2). Then, the compressed air is sent to the separator (3), and after the water droplets, dust and oil mist have been removed in the separator (3) it is sent into the hollow fiber membrane dehumidification device (4).

As shown in FIG. 2, after the compressed air sent into the hollow fiber membrane dehumidification device (4) is introduced into the entire air intake chamber (8), it is taken in from the opening at one end of the hollow fiber membranes (11) supported by the partition elements (7) to the inside of the membranes, and after flowing through this interior it is discharged from the opening at the other end to the air exhaust chamber (9). At this time, the interior of the hollow fiber membranes (11) is in a state where the partial pressure of the water vapor is high since the compressed air has compressed the outer air. Compared to this, the housing chamber (10) that positions the outside of the hollow fiber membranes (11) has been opened to the atmosphere which serves as the outer air through the medium of the through hole (6f), and in addition a portion of the dehumidified air described below has been refluxed as purged air. Therefore, as shown in FIG. 4, the partial pressure of the water vapor inside the hollow fiber membranes (11) is in a state where it is higher than the partial pressure of the water vapor outside (the housing chamber (10)), so the water vapor of the compressed air that flows through the inside passes through to the housing chamber (10) on the low pressure side. As a result of this, the water vapor is gradually removed from the compressed air as the compressed air flows through the inside of the hollow fiber membranes (11), and thus it becomes dehumidified air that dries the compressed air adequately when it is discharged to the air exhaust chamber (9).

As shown in FIG. 1, when the dehumidified air is discharged to the air exhaust chamber (9), the majority of the dehumidified air is sent to the air tank while the flow is controlled by the second orifice (30), and after it accumulates in the air tank it is used as the drive source for such things as air brakes. In addition, a portion of the dehumidified air is refluxed to the housing chamber (10) through the medium of the variable constrictor (12) and the reflux route (the pipe used for reflux (13), the reflux hole (6g). etc.) as purged air, and owing to this it is used in order to maintain the partial pressure of the water vapor in the housing chamber (10) in a state where it is lower than the partial pressure of the water vapor inside the membrane of the hollow fiber membranes (11). Then, by the repetition of this kind of operation of reflux of purged air, etc., the hollow fiber membrane type dehumidification device (4) ends up usually displaying an excellent dehumidification function.

Next, in the event that the pressure of the compressed air fluctuates due to the abnormalities of the air compressor (1), the pressure of the dehumidified air dehumidified by the hollow fiber membrane type dehumidification device (4) fluctuates. In addition, since a portion of the dehumidified air is removed as purged air, when the reflux amount of purged air increases or decreases the extent of the decline of the pressure of the dehumidified air also increases or decreases. Then, the extent of the decline in the pressure of the dehumidified air due to this purged air becomes greater in inverse ratio to the decline of the pressure of the dehumidified air (compressed air) based on the quantitative relationship between the dehumidified air and the purged air. Owing to this, when the pressure of the compressed air declines the effects of the decline in pressure due to the purged air become relatively great in the relationship between compressed air and purged air, even in the event that the reflux amount of purged air declines together with the pressure of the dehumidified air in tandem with this.

Here, in the embodiment of this invention, the purged air is caused to flow back through the medium of the variable constrictor (12), and the effects of the decline in pressure due to the purged air when the pressure of the compressed air declines are restricted to an absolute minimum by increasing or decreasing the opening-closing amount (the reflux amount of purged air) in accordance with the increase or decrease of the pressure of the compressed air due to the variable constrictor (12).

In other words, as shown in FIG. 3, when a portion of the dehumidified air with for example pressure (P1) is removed as purged air, this purged air is flowed to the variable constrictor (12) with pressure (P1), and is split into 2 branches by the primary pipe (14) and the secondary pipe (15). Then, the purged air that flows through the secondary pipe (15) flows into the first space (19a) from the first input port (18a) of the block body (18) through the medium of the first secondary flow route (26a), and the first space (19a) is turned into a state with pressure (P1). On the other hand, by restricting the flow of the purged air that flows through the primary pipe (14) from the first orifice (16), it flows from the second input port (18b) into the primary flow route (27) at pressure (P2), which is a lower pressure than pressure (P1). Then, the purged air of the primary flow route (27) flows into the second space (19b) through the medium of the second secondary flow route (26b), and the second space (19b) is turned into pressure (P2). Owing to this, a pressure differential is generated between the pressure (P1) and the pressure (P2) between the first space (19a) and the second space (19b), and due to this the thin plate element (25) that partitions these spaces (19a, 19b) is deformed to a curvature coefficient corresponding to the pressure differential. As a result, the central part of the thin plate element (25) is displaced by the displacement amount of corresponding to the pressure differential, and due to this the piston element (24), which grasps and holds this central part with the protruding parts (24a, 24b), moves forwards and backwards in an axial direction by the same amount of displacement.

When the piston element (24) moves forwards and backwards in the manner described above, the front end of the piston element (24) causes the opening part of the valve flow route (28) to open by an opening corresponding to the amount of movement on the side of the valve chamber (21). Due to this, the main flow route (27) and the valve chamber end up in a linked state, and the purged air present in the main flow route (27) flows into the valve chamber (21) with a flow volume corresponding to the opening, and it ends up flowing back from this valve chamber (21) to the housing chamber (10) in FIG. 2 through the medium of the discharge flow route (29) and the output port (18c).

At this time, the opening that regulates the reflux volume of the purged air changes in accordance with the amount of movement of the piston element (24), and the movement of the piston element (24) matches the amount of displacement of the central part of the thin plate element (25). Then, the displacement amount of the thin plate element (25) increases as the differential pressure becomes larger in reaction to the differential pressure between the first space (19a) (pressure P1) and the second space (19b) (pressure P2). Owing to this, when the differential pressure is small the amount of movement of the piston element (24) is small, so the valve flow route (28) opens with a small opening, and due to this a small amount of purged air ends up flowing from the primary flow route (27) into the valve chamber (21). On the other hand, when the pressure differential is large, contrary to the action described above a large amount of purged air ends up flowing from the primary flow route (27) into the valve chamber (21).

In addition, the pressure differential between the pressure (P1) of the first space (19a) and the pressure (P2) of the second space (19b) expands due to an increase of the flow volume of the purged air that flows through the first orifice (16), while it contracts on the other hand due to a decrease of the flow volume. Owing to this, in the event that the pressure (P1) of the dehumidified air declines due to the decline in the pressure of the compressed air, the pressure differential between the pressure (P1) and the pressure (P2) due to the first orifice (16) decreases, so the opening of the valve flow route (18) becomes smaller, and the results of this are that the flow volume (the reflux amount) of the purged air that flows from the primary flow route (27) into the valve chamber (21) through the medium of this valve flow route (28) decreases. Therefore, due to the fact that the pressure (P1) of the dehumidified air declines, even if the effects in the decline in the pressure of the dehumidified air due to the purged air become greater, an excessive decline in the pressure of the dehumidified air ends up being prevented.

Moreover, when the variable constrictor (12) is operating as described above, as shown in FIG. 2 the second orifice (30) restricts the flow of dehumidified air, and due to this sudden pressure fluctuations of the dehumidified air are held in check. Owing to this, sharp pressure fluctuations towards the purged air that is created by extracting a portion of the dehumidified air are prevented, so such unstable operations as hunting by the variable constrictor (12) are prevented.

EFFECTS OF THE INVENTION

According to the invention the decline in pressure due to the purged air is restrained more than in the case of a fixed constrictor, and owing to this an excessive decline in the pressure of the dehumidified air is prevented; the results of this are that it is possible to emit dehumidified air to the air tank of a dehumidification system with the highest pressure possible even if the pressure of the compressed air declines to a large extent.

This is a summary compositional diagram of a dehumidification system equipped with a hollow fiber membrane type dehumidification device.

[FIG. 2]

This is a summary compositional diagram of a hollow fiber membrane type dehumidification device.

[FIG. 3]

This is a cross-section diagram of the flow volume regulation valve.

[FIG. 4]

This is an explanatory diagram showing the working state of the hollow fiber membranes.

[FIG. 5]

This is a summary compositional diagram of a dehumidification system equipped with a hollow fiber membrane type dehumidification device, showing an example of the prior art.

EXPLANATION OF THE KEY

Figure 1:
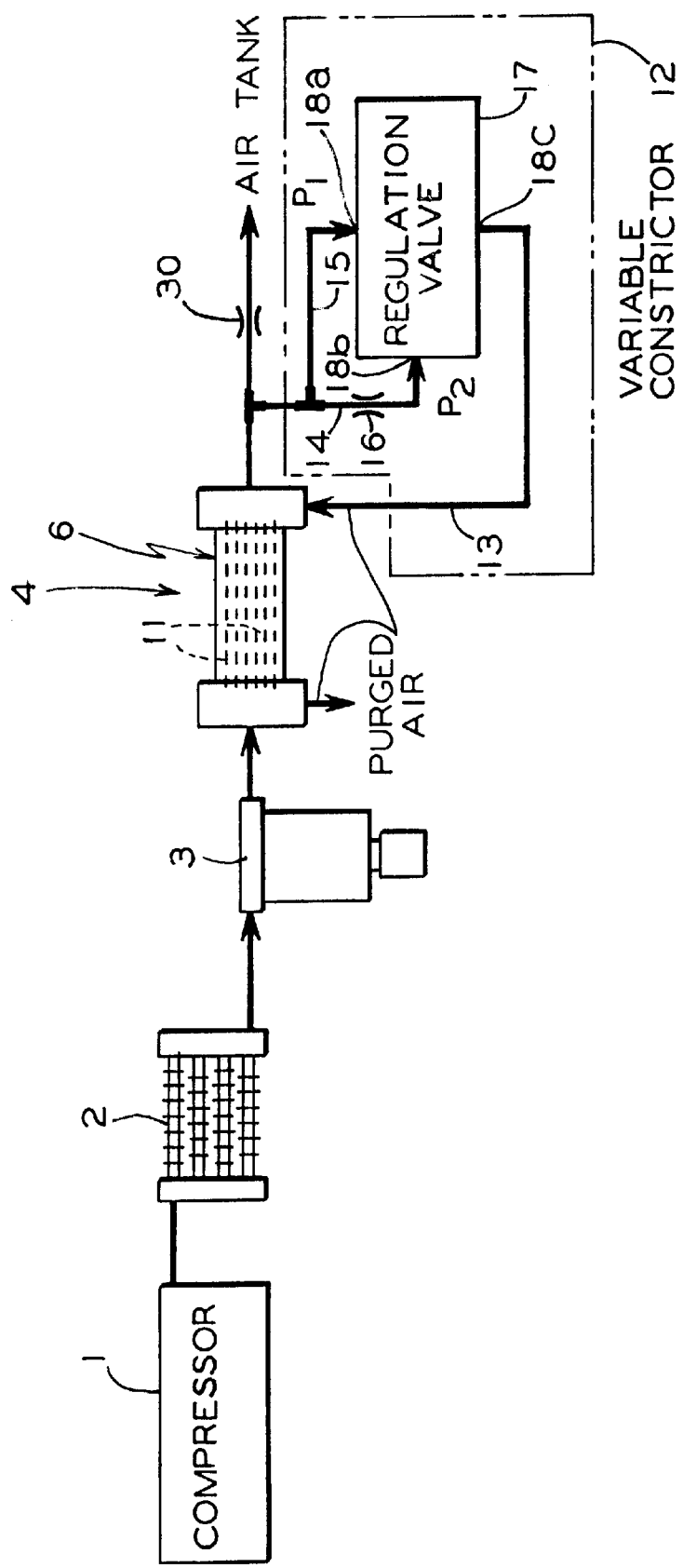
[FIG. 1]
Figure 2:
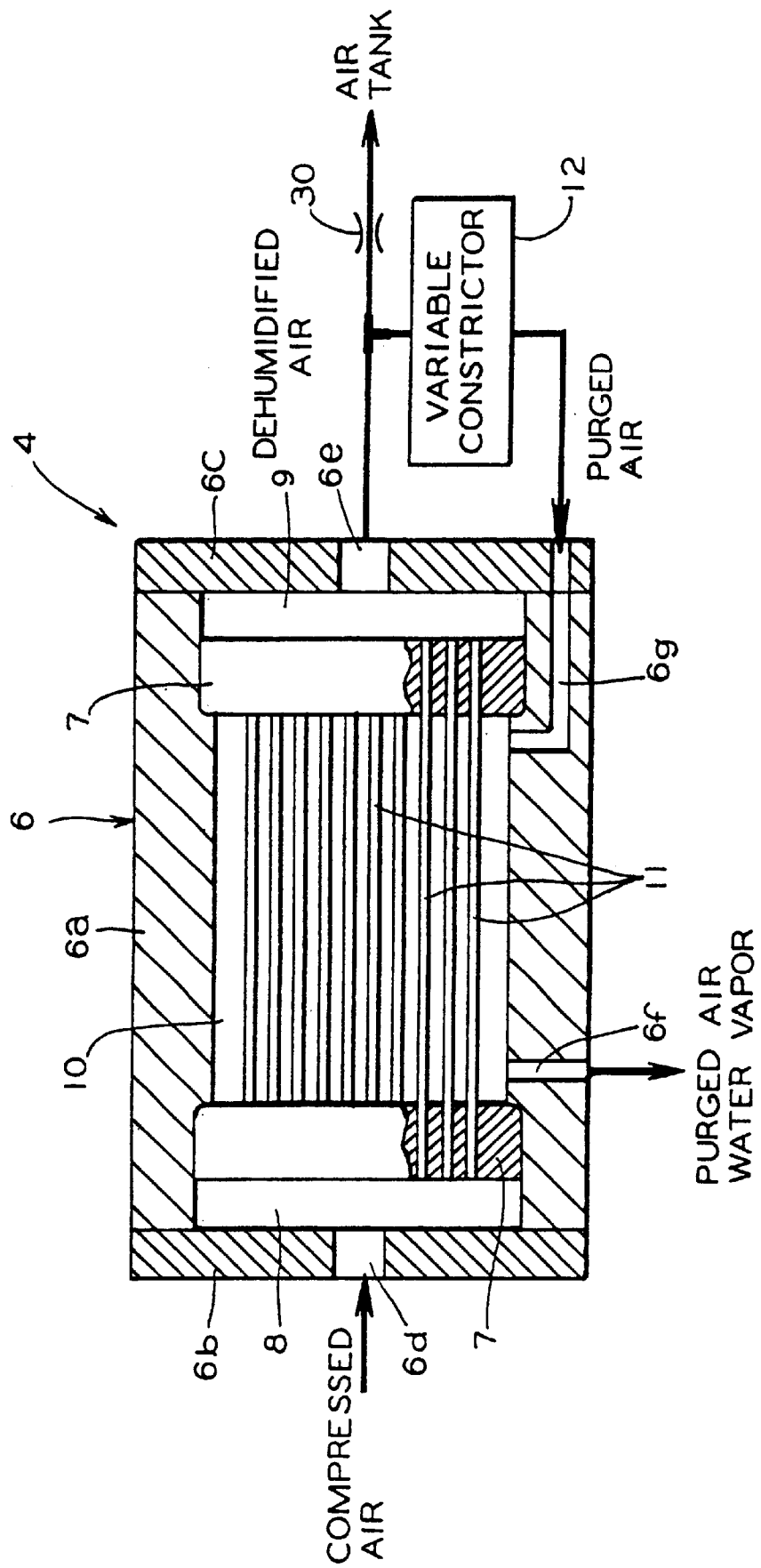
Figure 3:
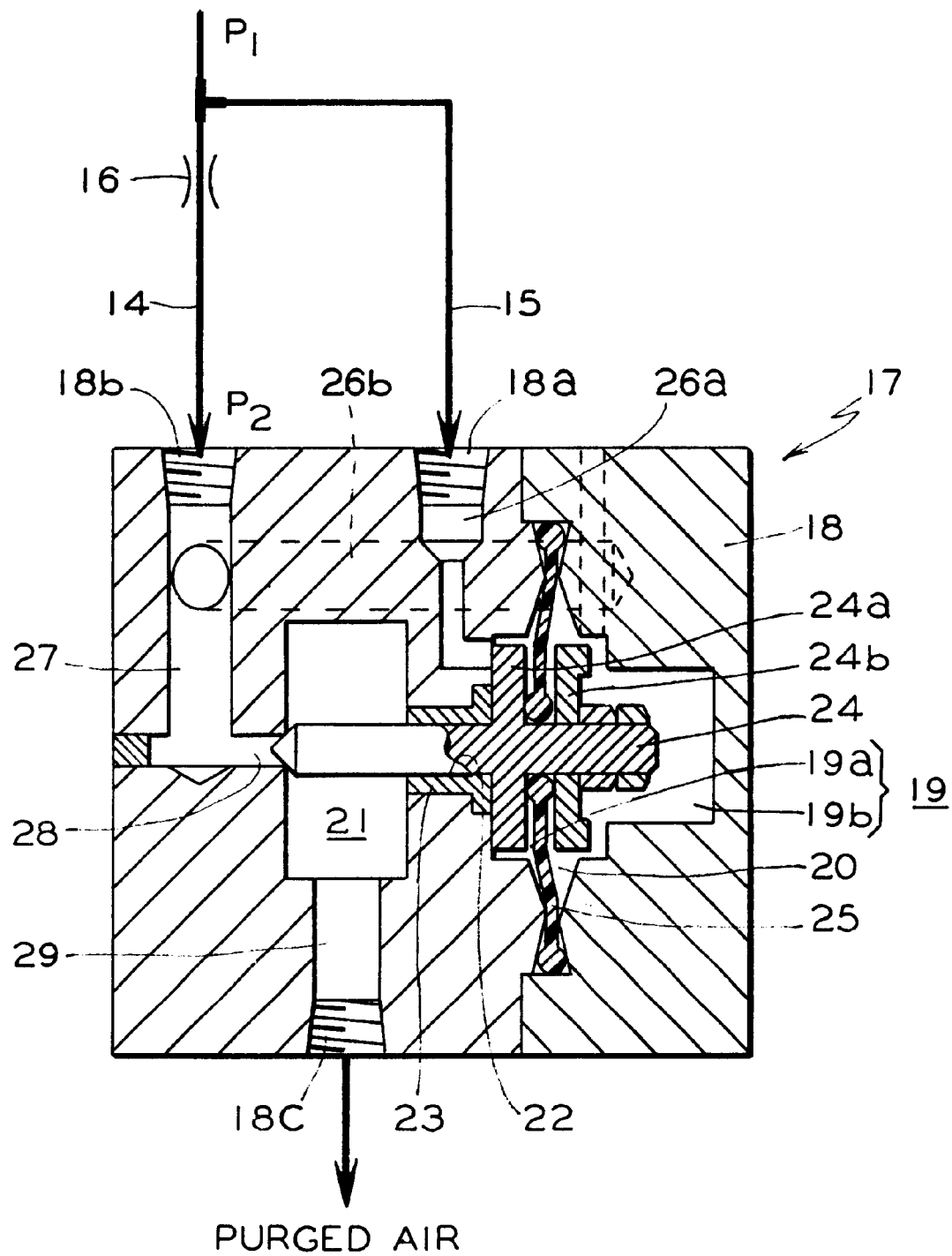
Figure 4:
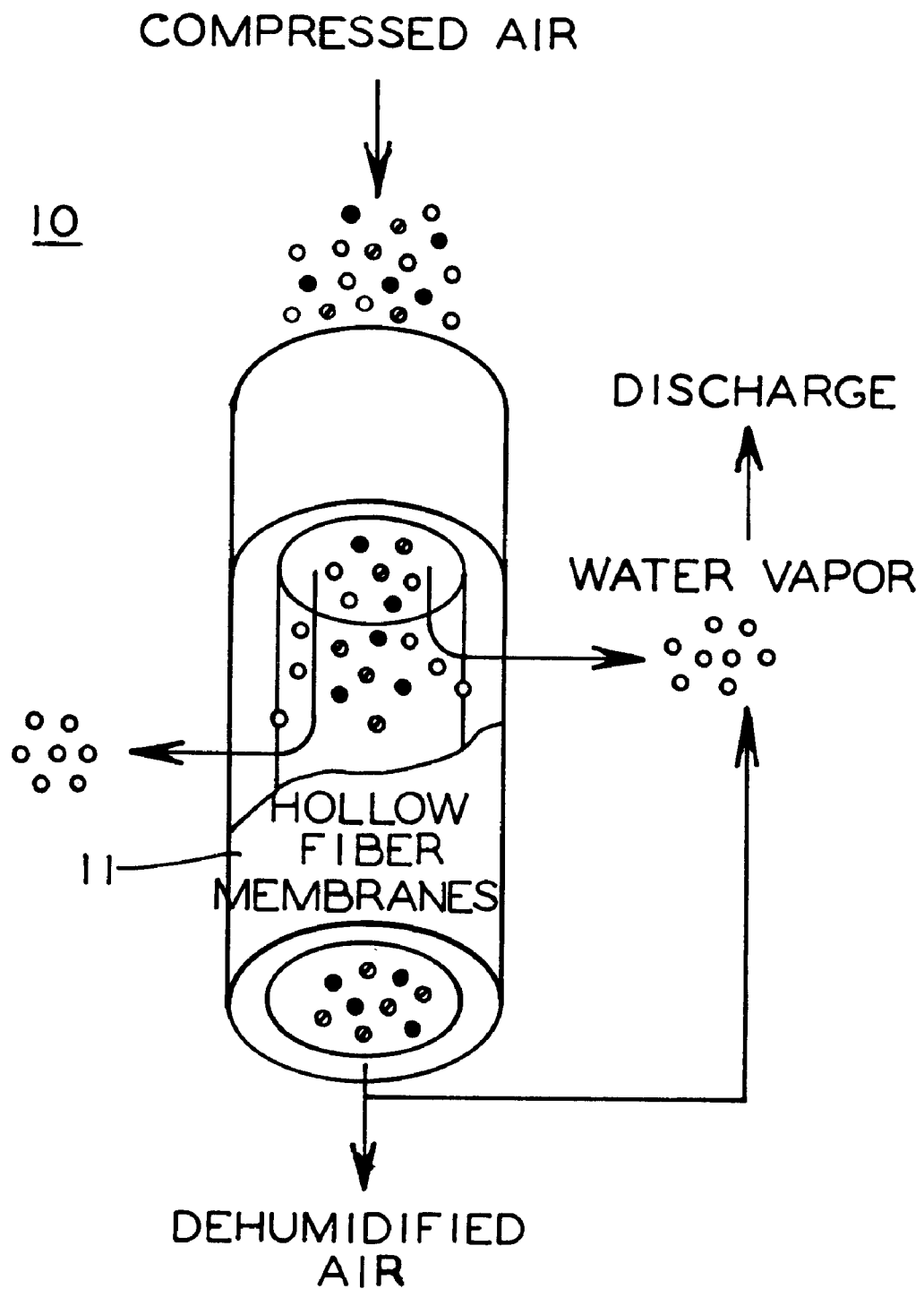
Figure 5:
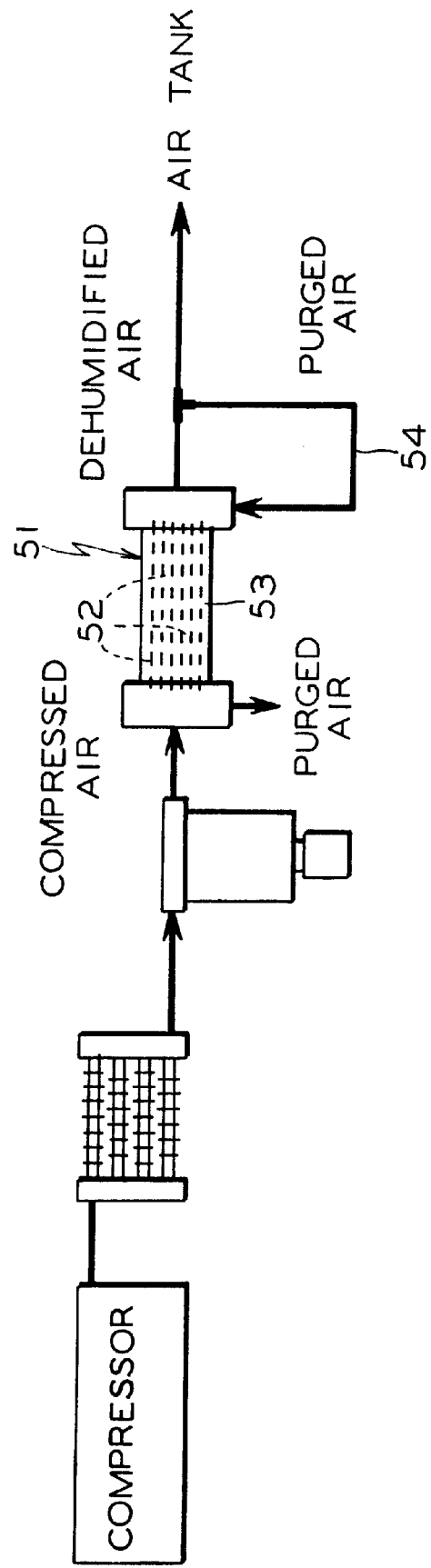

1 . . . Air compressor
2 . . . Aftercooler
3 . . . Separator
4 . . . Hollow fiber membrane type dehumidification device
5 . . . Air tank
6 . . . Housing
6a . . . Drum
6b, 6c . . . Covers
6d . . . Air intake opening
6e . . . Air exhaust opening
6f . . . Through hole
6g . . . Reflux hole
7 . . . Partition element
8 . . . Air intake chamber
9 . . . Air discharge chamber
10 . . . Housing chamber
11 . . . Hollow fiber membrane
12 . . . Variable constrictor
13 . . . Pipe used for reflux
14 . . . Primary pipe
15 . . . Secondary pipe
16 . . . First orifice
17 . . . Flow volume regulation valve
18 . . . Block body
19 . . . Cylinder chamber
19a . . . First space
19b . . . Second space
20 . . . Membrane plate chamber
21 . . . Valve chamber
22 . . . Abrading passage
23 . . . Seal element
24 . . . Piston element
25 . . . Thin plate element
[Document Name] Figures
[FIG. 1]
1 . . . Air compressor
[center] Purged air, purged air
[arrow leading from 30] Air tank
[lower right] Variable constrictor
[FIG. 2]
[left] Compressed air
[center] Purged air, water vapor
[right ] Dehumidified air
[arrow leading from 30] Air tank
12 . . . Variable constrictor
[arrow leading from 13] Purged air
[FIG. 3]
[above] Purged air (dehumidified air)
[below] Purged air
[FIG. 4]
[above] Compressed air (moist air)
[inside cylinder] Hollow fiber membranes
[below] Dehumidified air
[right, to bottom]
Discharge (moist air)
Water vapor that permeates through
Purged air (dehumidified air)
[FIG. 4]
[left] Air compressor
[center, above] Compressed air
[center, below] Purged air
[right, above arrow] Dehumidified air
[right below arrow] Purged air
[right, end of arrow] Air tank

What is claimed is:

1. A hollow fiber membrane dehumidification device comprising:

(a) hollow fiber membranes that cause compressed air supplied from one end to an interior of said hollow fiber membranes to flow through and simultaneously discharge moisture in such compressed air to an outside of said hollow fiber membranes and by doing so exhausts such compressed air to an opposite end as dehumidified air;

(b) a reflux route that causes a portion of dehumidified air exhausted from said hollow fiber membranes to flow back to said outside of said hollow fiber membranes as purged air;

(c) a variable restrictor on said reflux route that one of increases and decreases an opening-closing volume in accordance with one of an increase and decrease of a pressure of such compressed air that flows through said interior of said hollow fiber membranes;

(d) a primary flow route and a secondary flow route that split said reflux flow route into two branches;

(e) a first orifice on said primary flow route that controls flow of purged air in said primary flow route; and (f) a flow volume regulation valve capable of opening a valve part based on such opening-closing volume in response to a pressure differential of purged air that flows back through said primary flow route and said secondary flow route, causing said primary flow route to be linked to said reflux route through said valve part.

2. The hollow fiber membrane dehumidification device recorded in claim 1 characterized by the fact that it possesses a second orifice that controls the flow of said dehumidified air.

* * * * *